(12) United States Patent
Senoue

(10) Patent No.: US 10,826,073 B2
(45) Date of Patent: Nov. 3, 2020

(54) ALL-SOLID-STATE BATTERY

(71) Applicant: TOYOTA JIDOSHA KABUSHIKI KAISHA, Toyota (JP)

(72) Inventor: Masaharu Senoue, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 16/366,364

(22) Filed: Mar. 27, 2019

(65) Prior Publication Data

US 2019/0334178 A1 Oct. 31, 2019

(30) Foreign Application Priority Data

Apr. 27, 2018 (JP) ................................. 2018-086171

(51) Int. Cl.
*H01M 4/70* (2006.01)
*H01M 10/0585* (2010.01)
*H01M 2/18* (2006.01)
*H01M 2/16* (2006.01)
*H01M 4/02* (2006.01)

(52) U.S. Cl.
CPC ........... *H01M 4/70* (2013.01); *H01M 2/1653* (2013.01); *H01M 2/18* (2013.01); *H01M 10/0585* (2013.01); *H01M 2004/021* (2013.01); *H01M 2004/027* (2013.01)

(58) Field of Classification Search
CPC ............. H01M 2004/021; H01M 2/18; H01M 2/1686; H01M 10/0481; H01M 4/70
See application file for complete search history.

(56) References Cited

U.S. PATENT DOCUMENTS

| 6,335,114 B1* | 1/2002 | Ueshima | H01M 2/0285 |
| | | | 429/161 |
| 2006/0269835 A1* | 11/2006 | Song | H01M 2/18 |
| | | | 429/142 |
| 2009/0233164 A1* | 9/2009 | Shimamura | H01M 6/485 |
| | | | 429/149 |
| 2012/0301791 A1* | 11/2012 | Kojima | H01M 2/0212 |
| | | | 429/246 |

(Continued)

FOREIGN PATENT DOCUMENTS

| JP | 2004311357 A | * | 11/2004 |
| JP | 2011216403 A | * | 10/2011 |
| JP | 2017-183111 A | | 10/2017 |

*Primary Examiner* — Imran Akram
(74) *Attorney, Agent, or Firm* — Oliff PLC

(57) ABSTRACT

A separator layer of the all-solid-state battery disclosed herein has a protruding portion protruding outward beyond end portions of opposed portions of a positive electrode and a negative electrode, and at least a part of the protruding portion layer is formed of a dense structure portion that is dense enough to prevent contact between the positive electrode and the negative electrode. The dense structure portion is formed at a position satisfying A<B, where A denotes a shortest distance from the end portion of the opposed portions of the positive electrode and the negative electrode to the dense structure portion, and B denotes a shortest distance from a surface of the negative electrode active material layer at the end portion of the opposed portions of the positive electrode and the negative electrode to the positive electrode current collector at the end portion of the opposed portions.

8 Claims, 4 Drawing Sheets

(56) References Cited

U.S. PATENT DOCUMENTS

2016/0043374 A1* 2/2016 Seong ................. H01M 2/1673
429/143
2016/0043401 A1* 2/2016 Yamaguchi ........... H01M 4/621
429/163

* cited by examiner

ALL-SOLID-STATE BATTERY

CROSS-REFERENCE TO RELATED APPLICATIONS

This application claims priority based on Japanese Patent Application No. 2018-086171 filed on Apr. 27, 2018, the entire contents of which are incorporated herein by reference.

BACKGROUND OF THE INVENTION

1. Field of the Invention

The present invention relates to an all-solid-state battery including a solid electrolyte, and more particularly to a structure of a separator layer of an all-solid-state battery.

2. Description of the Related Art

A secondary battery capable of realizing a comparatively high output and a high capacity, such as a lithium ion secondary battery, is important as a power source to be mounted on a vehicle that uses electricity as a driving source, or as a power source installed in electric products such as personal computers and portable terminals. In particular, lithium ion secondary batteries that are lightweight and provide high energy density are preferable as high-output power sources for driving vehicles such as electric vehicles (EV), plug-in hybrid vehicles (PHV), and hybrid vehicles (HV), and demand for such batteries is expected to grow.

Such a high-output secondary battery can be exemplified by a secondary battery in which a powdery solid electrolyte is used instead of a liquid electrolyte (electrolytic solution), such a battery being also called an all-solid-state battery.

Since an all-solid-state battery does not use a liquid electrolyte, a laminated electrode body of a laminated structure composed of a positive electrode, a negative electrode and a separator layer (also referred to as "solid electrolyte layer") can be easily formed without a complicated treatment involving handling of an organic solvent such as a nonaqueous electrolytic solution. In addition, since no electrolytic solution is used, the structure of the electrode body is simplified, which can also contribute to improvement of battery capacity per unit volume of the battery. For this reason, such a battery is expected to be a high-output power source for driving a vehicle which requires a higher capacity.

Incidentally, in one form of the all-solid-state battery, a separator layer (solid electrolyte layer) is provided with solid electrolyte particles and a base material having a porous structure made of a polymer such as a polyolefin. For example, JP 2017-183111 A discloses a separator in which crystalline oxide-based inorganic solid electrolyte particles having an average particle diameter of 5 μm to 100 μm are held as a layer on a porous base material made of a polyolefin resin or the like. Advantages of a separator having such a porous base material are that a contribution is made to the improvement of ionic conductivity by thickness reduction of the separator layer and that flexibility of the separator layer is increased to improve processability of the battery.

SUMMARY

However, the laminated electrode body having the separator in which solid electrolyte particles are held on a porous base material as described in JP 2017-183111 A has the following problems.

That is, in the laminated electrode body of this type, it is common to increase the size of the negative electrode over that of the positive electrode in order to ensure stable charging and discharging. Therefore, the negative electrode has a protruding portion that protrudes outward beyond the opposed portions of the positive and negative electrodes (laminated portions of the positive and negative electrodes).

Further, the separator layer is formed to have a size equal to or even larger than that of the negative electrode in order to more reliably prevent a short circuit. Therefore, the separator layer also has a protruding portion that protrudes outward beyond the opposed portions of the positive and negative electrodes. Here, since such a protruding portion protrudes from the opposed portions of the positive and negative electrodes in the laminated electrode body, the pressure applied in the lamination direction is not applied strongly in this portion. From this, it follows that the solid electrolyte particles are likely to drop off from the porous base material at the protruding portion, for example, when some kind of impact is applied. The drop-off of the solid electrolyte particles in the protruding portion, in particular, the drop-off of the solid electrolyte particles from a portion facing the protruding portion of the negative electrode, is undesirable because the protruding portion of the negative electrode, which is easily movable at the end portion of the laminated electrode body, can come into contact with the positive electrode end portion, thereby causing short circuit.

The present invention has been created to solve the above-mentioned problems associated with an all-solid-state battery including such a separator layer in which solid electrolyte particles are held on a porous base material, and it is an object of the present invention to provide an all-solid-state battery including a separator layer in which solid electrolyte particles are held on a porous base material, the separator layer being configured so that contact between the protruding portion of a negative electrode and a positive electrode end portion can be reliably prevented.

In order to achieve the abovementioned object, the all-solid-state battery disclosed herein comprises a laminated electrode body of a laminated structure having a positive electrode in which a positive electrode active material layer including positive electrode active material particles and solid electrolyte particles is formed on a positive electrode current collector, a negative electrode in which a negative electrode active material layer including negative electrode active material particles and solid electrolyte particles is formed on a negative electrode current collector; and a separator layer including a base material having a porous structure (hereinafter also simply referred to as "porous base material") and solid electrolyte particles held on the base material.

In the all-solid-state battery disclosed herein, the negative electrode and the separator layer each have a protruding portion protruding outward beyond end portions of opposed portions of the positive electrode and the negative electrode at least in a part of the end portion of the laminated electrode body.

Further, at least a part of the protruding portion of the separator layer is formed of a dense structure portion that is dense enough to prevent contact between the positive electrode and the negative electrode.

In addition, the dense structure portion is formed at a position satisfying A<B, where A denotes a shortest distance from the end portion of the opposed portions of the positive electrode and the negative electrode to the dense structure portion, and B denotes a shortest distance from a surface of the negative electrode active material layer at the end portion of the opposed portions of the positive electrode and the negative electrode to the positive electrode current collector at the end portion of the opposed portions.

The inventors of the present invention have found out that where the protruding portion of the separator layer that faces at least a portion where the protruding portion of the negative electrode can come into contact with the positive electrode end portion is formed of the dense structure portion, it is possible to prevent the occurrence of troubles caused by the drop-off of the solid electrolyte particles in the protruding portion of the separator layer, and the present invention has been accomplished on the basis of this finding.

That is, in the all-solid-state battery disclosed herein, as described above, the dense structure portion is provided so as to satisfy A<B in the protruding portion of the separator layer. As a result, a configuration is obtained such that even when an exterior force of some kind is applied and the protruding portion of the negative electrode moves to a position close to the end portion of the opposed positive electrode, the situation in which troubles caused by the drop-off of the solid electrolyte particles can occur is prevented and contact between the protruding portion of the negative electrode and the positive electrode end portion (more specifically, the positive electrode current collector exposed at the end portion) can be reliably prevented.

In a preferred embodiment of the all-solid-state battery disclosed herein, the porous base material and the dense structure portion are both composed of a thermoplastic resin.

The thermoplastic resin is suitable as a polymer material for forming the porous base material. Furthermore, by heating, a part of the porous structure can be readily changed into a dense structure as a thermally fused body. Further, insulating properties suitable for the separator base material can be realized.

A porous base material having a porosity of at least 80% (measured, for example, according to an Archimedes method) is preferred. With a porous base material having such a high porosity, the solid electrolyte particles can be held at a higher ratio, and high ion conductivity in the separator layer can be realized.

Further, in one preferred shape of the all-solid-state battery disclosed herein, the laminated electrode body is formed by laminating rectangular positive and negative electrodes and separator layer. The dense structure portion is formed in a protruding portion of an end portion of each side edge of the rectangular separator layer.

In the all-solid-state battery of such a configuration, in the laminated electrode body configured by laminating the rectangular positive and negative electrodes and separator layer, the above-described short circuit prevention can be realized at the end portion of any side edge.

DETAILED DESCRIPTION OF THE PREFERRED EMBODIMENTS

Hereinafter, preferred embodiments of the all-solid-state battery disclosed herein will be described with reference to the drawings as appropriate. Incidentally, matters other than those particularly mentioned in the present description and necessary for the implementation of the present invention can be grasped by a person skilled in the art as design matters which are based on the related art in the pertinent field. Numerical ranges A to B (A and B are arbitrary numbers) in the present description are assumed to indicate A or more and B or less.

In the present description, the "(positive and negative electrode) active material" refers to a substance participating in occlusion and release of charge carriers (for example, lithium ions in a lithium ion secondary battery) on the positive electrode side or the negative electrode side.

In the following description, an all-solid-state lithium ion secondary battery is taken as an example of an application target of the technique disclosed herein, but the present invention is not limited thereto. The all-solid-state battery disclosed herein may be of a type that uses another metal ion as a charge carrier, for example, a sodium ion secondary battery, a magnesium ion secondary battery, or the like.

Figure 1:
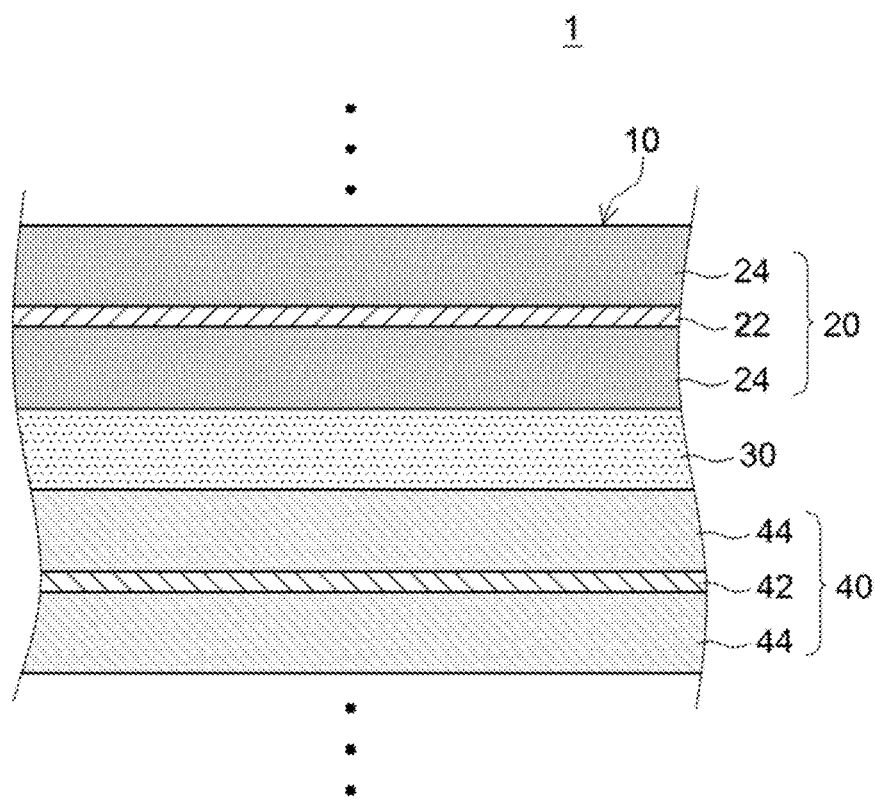
FIG. 1 is a view for schematically explaining a configuration of an all-solid-state battery including a laminated electrode body.

FIG. 1 schematically shows an all-solid-state battery (all-solid-state lithium ion secondary battery) 1 provided with a laminated electrode body 10 having a typical laminated structure. That is, generally speaking, the all-solid-state lithium ion secondary battery 1 according to the present embodiment is configured by laminating a predetermined number of sheet-shaped positive electrodes 20 and negative electrodes 40, with separator layers (solid electrolyte layers) 30 being interposed between the positive and negative electrodes, to configure the laminated electrode body 10 and accommodating the laminated electrode body in a predetermined housing (battery case) (not shown).

From the viewpoints of high physical strength, heat dissipation property and the like, a housing made of a metal (for example, made of aluminum) can be preferably used. Alternatively, the housing may be composed of a laminated film to improve loadability and reduce the weight of the entire battery module. As a preferred example in this case, a laminated film has a three-layer structure in which a metal layer such as aluminum is disposed between two synthetic resin layers.

As shown in the figure, the positive electrode 20 includes a positive electrode current collector 22 made of an aluminum foil or the like, and a positive electrode active material layer 24 which includes a predetermined positive electrode active material and a solid electrolyte and is formed on both sides of the positive electrode current collector. In addition, the negative electrode 40 includes a negative electrode current collector 42 made of a copper foil or the like, and a negative electrode active material layer 44 which includes a predetermined negative electrode active materials and a solid electrolyte and is formed on both sides of the negative electrode current collector.

The separator layer 30 includes solid electrolyte particles of the same type as the solid electrolyte contained in the positive and negative electrode active material layers 24 and 44 and a porous base material described hereinbelow. This layer functions as a separator securing isolation between the positive and negative electrodes while ensuring ionic conductivity. Next, each layer constituting the laminated electrode body 10 will be described in detail.

Positive electrodes which have been used in batteries of this type can be used without particular limitation as the positive electrode 20 included in the all-solid-state lithium ion secondary battery 1 according to the present embodiment.

Positive electrode current collectors which have been used in batteries of this type can be used without particular limitation as the positive electrode current collector 22. Typically, a metal positive electrode current collector having good electric conductivity is preferable, and the collector can be configured of a metal material, for example, such as aluminum, nickel, titanium, stainless steel or the like. Aluminum (for example, aluminum foil) is particularly preferable. The thickness of the positive electrode current collector 22 is not particularly limited, but from the standpoint of balance between the capacity density of the battery and the strength of the current collector, a thickness of about 5 µm to 50 µm is suitable, and about 8 µm to 30 µm is more preferable.

The positive electrode active material layer 24 includes a positive electrode active material and a solid electrolyte and, if necessary, may further include a conductive material and a binder (binding material).

Examples of the solid electrolyte that can be used include various oxide-based solid electrolytes or sulfide-based solid electrolytes. Preferable examples of the oxide-based solid electrolyte include various oxides having a NASICON structure, a garnet type structure, or a perovskite type structure.

For example, a compound represented by the general formula $Li_xAO_y$ (wherein A is B, C, Al, Si, P, S, Ti, Zr, Nb, Mo, Ta, or W, and x and y are positive real numbers) can be mentioned. Specific examples thereof include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. Alternative suitable examples include glass or glass ceramics of a $Li_2O$—$B_2O_3$—$P_2O_5$ type, $Li_2O$—$SiO_2$ type, $Li_2O$—$B_2O_3$ type, $Li_2O$—$B_2O_3$—$ZnO$ type and the like.

In particular, use of a sulfide-based solid electrolyte is preferable because such electrolyte has high ion conductivity. For example, glass or glass ceramics of a $Li_2S$—$SiS_2$ type, $Li_2S$—$P_2S_3$ type, $Li_2S$—$P_2S_5$ type, $Li_2S$—$GeS_2$ type, $Li_2S$—$B_2S_3$ type, $Li_3PO_4$—$P_2S_5$ type and $Li_4SiO_4$—$Li_2S$—$SiS_2$ type can be mentioned.

From the viewpoint of realizing higher ionic conductivity, it is preferable to use a $Li_2S$-based solid solution composed of $Li_2S$ and a lithium halide (for example, LiCl, LiBr, and LiI). Preferred examples thereof include LiBr—$Li_2S$—$P_2S_5$, LiI—$Li_2S$—$P_2S_5$, LiBr—LiI—$Li_2S$—$P_2S_5$ and the like.

The average particle diameter ($D_{50}$) of the solid electrolyte particles to be used which is determined by a laser diffraction/scattering method is suitably, for example, about 0.5 to 10 µm, and particularly preferably about 1 µm to 5 µm.

Various compounds which have been conventionally used in batteries of this type can be used as the positive electrode active material included in the positive electrode active material layer 24. Suitable examples include composite oxides with a layered structure typified by $LiCoO_2$, $LiNiO_2$, $LiNi_xCo_yMn_{(1-x-y)}O_2$ (where $0<x<1$; $0<y<1$; $0<x+y<1$).

Alternatively, composite oxides having a spinel structure such as $Li_2NiMn_3O_8$, $LiMn_2O_4$, $Li_{1+x}Mn_{2-y}M_yO_4$ (wherein M is absent or one or more metal elements selected from Al, Mg, Co, Fe, Ni, and Zn; $0 \leq x<1$; $0 \leq y<2$) and composite compounds having an olivine structure such as $LiFePO_4$, and the like can be used.

The average particle diameter ($D_{50}$) of the positive electrode active material to be used which is determined by a laser diffraction/scattering method is suitably, for example, about 0.5 µm to 20 µm, and particularly preferably about 1 µm to 10 µm.

Particularly preferable positive electrode active materials include those in which at least a part of the surface of the active material particles is covered with a film made of a solid electrolyte. In particular, it is preferable to use a positive electrode active material coated with an oxide-based solid electrolyte. As a result of using the positive electrode active material particles coated with a solid electrolyte, the positive electrode active material and the solid electrolyte in the positive electrode active material layer 24 can be adhered more favorably.

The thickness of the solid electrolyte film covering the positive electrode active material particles is not particularly limited, but is preferably such that does not greatly hinder the electron conductivity. For example, it is preferable that the average film thickness be 0.1 nm to 100 nm. In addition, the coverage of the solid electrolyte film in the surface area of the positive electrode active material particles is preferably 30% or more, more preferably 40% or more.

The compounding ratio of the positive electrode active material and the solid electrolyte in the positive electrode active material layer 24 is not particularly limited. Typically, the mass ratio (P:S) of the positive electrode active material (P) and the solid electrolyte (S) may be about 50:50 to 95:5.

The thickness of the positive electrode active material layer 24 is not particularly limited. Typically, the thickness can be 10 µm to 500 µm.

Similarly to the positive electrode active material layers of the conventional batteries of this type, the positive electrode active material layer 24 can include various optional components in addition to the positive electrode active material and the solid electrolyte. For example, a conductive material, a binder, or the like can be included. As the conductive material, carbon black such as acetylene black or other carbon materials (graphite, carbon nanotube, and the like) can be suitably used. As the binder, a fluorine-based binder such as polyvinylidene fluoride (PVDF) or polytetrafluoroethylene (PTFE) or a rubber-based binder such as styrene butadiene rubber (SBR) or the like can be suitably used.

Negative electrodes which have been used in batteries of this type can be used without particular limitation as the negative electrode 40 included in the all-solid-state lithium ion secondary battery 1 according to the present embodiment.

Negative electrode current collectors which have been used in batteries of this type can be used without particular limitation as the negative electrode current collector 42. Typically, a metal negative electrode current collector having good electric conductivity is preferable, and for example, copper (for example, copper foil) or an alloy mainly including copper can be used. The thickness of the negative electrode current collector 42 is not particularly limited, but from the standpoint of balance between the capacity density of the battery and the strength of the current collector, a thickness of about 5 µm to 50 µm is suitable, and about 8 µm to 30 µm is more preferable.

The negative electrode active material layer 44 includes a negative electrode active material and a solid electrolyte, and may further include a binder or the like, if necessary.

The solid electrolyte included in the negative electrode active material layer 44 may be the same as that contained in the above-described positive electrode active material layer 24, and redundant description thereof is omitted.

Various compounds which have been conventionally used in batteries of this type can be used as the negative electrode active material included in the above-described negative electrode active material layer 24. For example, a carbon-based negative electrode active material such as graphite, mesocarbon microbeads, carbon black (acetylene black, Ketjen black, and the like) can be used.

Further, a negative electrode active material with high energy density can be exemplified by a negative electrode active material having silicon (Si) or tin (Sn) as a constituent element.

Specifically, a silicon (Si) based negative electrode active material can be exemplified by Si, silicon oxide represented by $SiO_a$ (where $0.05<a<1.95$), silicon carbide represented by $SiC_b$ ($0<b<1$), silicon nitride represented by $SiN_c$ ($0<c<4/3$), and the like.

Other examples of the silicon-based negative electrode active material are alloy materials comprising silicon and an element other than silicon. Examples of elements other than silicon include Fe, Co, Sb, Bi, Pb, Ni, Cu, Zn, Ge, In, Sn, Ti and the like.

Meanwhile, a Sn-based negative electrode active material can be exemplified by tin, tin oxide, tin nitride, tin-containing alloys and the like, solid solutions thereof, and the like. Some of tin atoms contained in these compounds may be substituted with one or two or more elements.

The oxide can be exemplified by tin oxide represented by $SnO_d$ ($0<d<2$), tin dioxide ($SnO_2$) and the like. Examples of the tin-containing alloys include Ni—Sn alloys, Mg—Sn alloys, Fe—Sn alloys, Cu—Sn alloys, Ti—Sn alloys and the like. Examples of the tin compound include $SnSiO_3$, $Ni_2Sn_4$, $Mg_2Sn$ and the like.

The average particle diameter ($D_{50}$) of the negative electrode active material which is determined by a laser diffraction/scattering method is suitably, for example, about 1 μm to 20 μm, and particularly preferably about 2 μm to 10 μm.

The thickness of the negative electrode active material layer 44 is not particularly limited. Typically, the thickness can be 10 μm to 500 μm.

The compounding ratio of the negative electrode active material and the solid electrolyte in the negative electrode active material layer 44 is not particularly limited. Typically, the mass ratio (N:S) of the negative electrode active material (N) and the solid electrolyte (S) may be about 50:50 to 95:5.

Similarly to the negative electrode active material layers of the conventional batteries of this type, the negative electrode active material layer 44 can include various optional components in addition to the negative electrode active material and the solid electrolyte. For example, a conductive material, a binder, or the like can be included in the same manner as in the positive electrode active material 24. As the conductive material, carbon black such as acetylene black or other carbon materials (graphite, carbon nanotube, and the like) can be suitably used. As the binder, a fluorine-based binder such as PVDF and PTFE or a rubber-based binder such as SBR or the like can be suitably used.

Similarly to the conventional batteries of this type, the separator layer 30 provided in the all-solid-state lithium ion secondary battery 1 according to the present embodiment is composed of various solid electrolyte particles 34 and a base material 32 having a porous structure. The separator layer 30 can include various optional components in addition to the porous base material 32 and the solid electrolyte particles 34. For example, similarly to the positive and negative electrode active material layers, a binder can be included to improve the retention of the solid electrolyte particles 34 on the base material 32.

Figure 2:
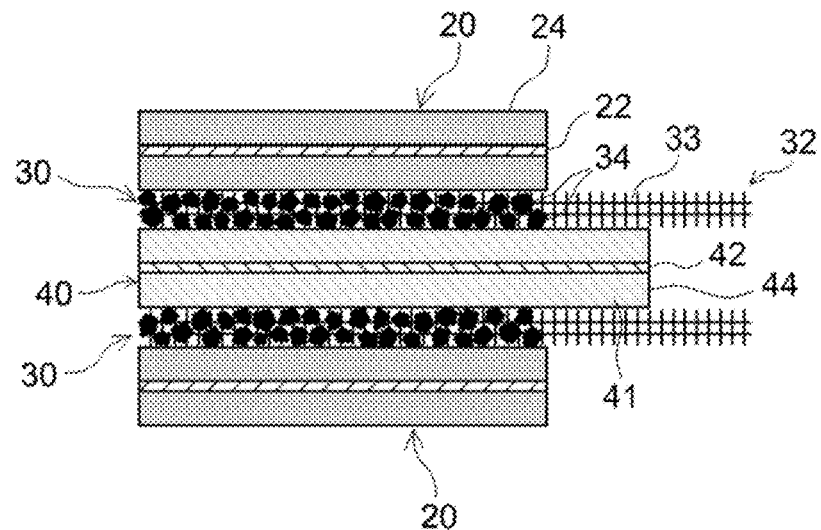
FIG. 2 is a view for schematically explaining an end portion of a laminated electrode body including a porous base material in separator layers, this view schematically showing a state before the end portions of the base material are thermally fused.

As shown in FIG. 2, the porous base material 32 is a three-dimensional network structure having a porosity of preferably 80% or more, and the solid electrolyte particles 34 are held in the pores of the base material 32. This makes it possible to improve the mechanical strength while maintaining the lithium ion conductivity of the separator layer 30. The porosity can be determined by the Archimedes method. Alternatively, it may be simply determined from the volume ($cm^3$), mass (g) and true density ($g/cm^3$) of the base material having a certain size.

The thickness of the separator layer 30 is not particularly limited. Considering high lithium ion conductivity and suppression of internal resistance, the thickness of 10 μm to 200 μm is suitable and, within this range, the thickness of 100 μm or less is preferable.

The porous base material 32 is preferably formed of a thermoplastic resin material. For example, polyolefin resins such as polyethylene and polypropylene are preferable. Alternatively, thermoplastic resins such as polyamides, polyamide imides, thermoplastic polyimides, thermoplastic polyester resins and the like are also preferable. Alternatively, a base material of nonwoven fabric made of glass fiber or the like may be used.

As shown in FIG. 2, in the porous base material 32 of the separator layer 30 according to the present embodiment, the protruding portion 33 protruding outward beyond the opposed portions of the positive and negative electrodes (laminated portions of the positive and negative electrode) is configured only of the base material 32 and does not hold the solid electrolyte particles.

Figure 3:
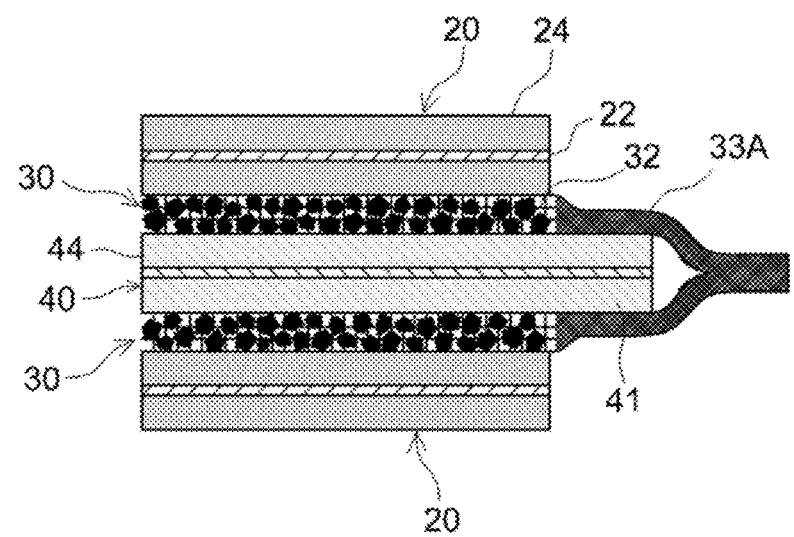
FIG. 3 is a view for schematically explaining an end portion of a laminated electrode body including a porous base material in separator layers, this view schematically showing a state after the end portions of the base material are thermally fused to form a dense structure portion.

As shown in FIG. 3, in the protruding portion 33, a dense structure portion 33A having a dense structure in which the three-dimensional network structure has been eliminated in advance is formed by thermal fusion performed at an appropriate heating temperature corresponding to the type of thermoplastic resin.

Figure 4:
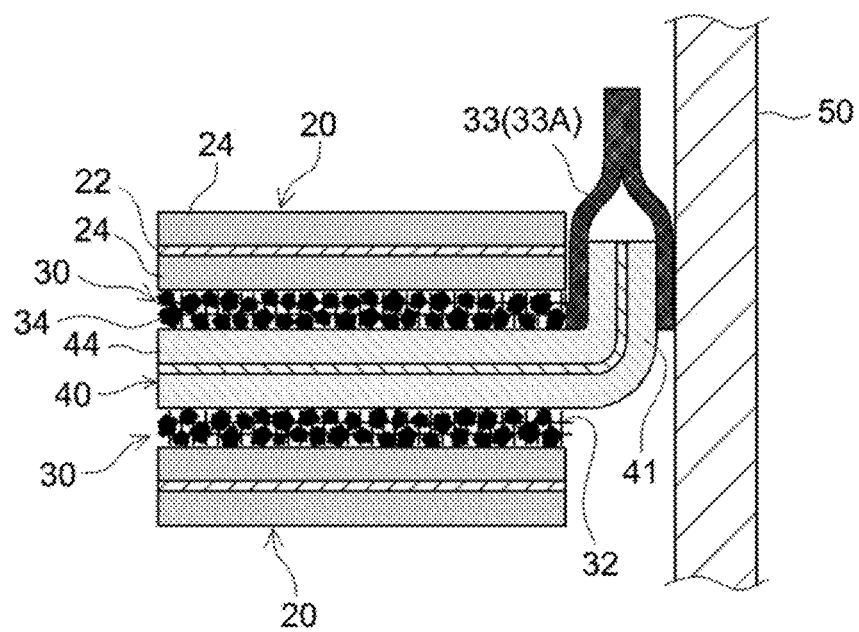
FIG. 4 is a view for schematically explaining a state in which contact between the protruding portion of the negative electrode and the positive electrode is prevented by the dense structure portion of the separator layer.

As a result, as shown in FIG. 4, even when vibration or other external force is applied to the laminated electrode body 10 in the casing 50 made of an aluminum laminated film or the like, and the protruding portion 41 of the negative electrode 40 becomes close to the end portion of the opposed positive electrode 20 (positive electrode current collector 22), the dense structure portion 33A serves as a barrier to prevent contact between the positive and negative electrodes, thereby preventing a short circuit.

Figure 5:
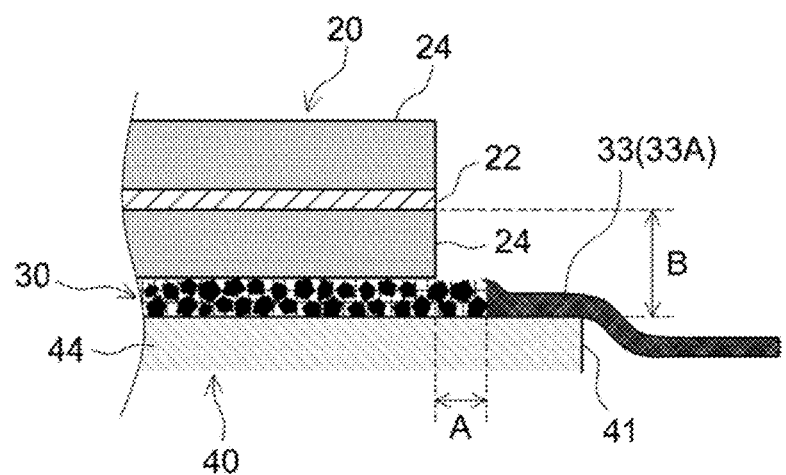
FIG. 5 is a view for schematically explaining a configuration in which a dense structure portion is formed at a position satisfying A<B.

Further, as shown in FIG. 5, typically, the dense structure portion 33A is formed at a position satisfying A<B, where A denotes the shortest distance from the end portion of the opposed portions of the positive electrode (laminated portions of the positive and negative electrodes) and the negative electrode to the dense structure portion 33A, and B denotes the shortest distance from the surface of the negative electrode active material layer 44 in the end portion at the opposed portions of the positive and negative electrodes to the positive electrode current collector 22 at the end portion of the opposed portions. As a result, the short circuit prevention effect illustrated by FIG. 4 can be reliably realized.

As long as the all-solid-state lithium ion secondary battery 1 disclosed herein has the above-described configuration, the manufacturing process thereof is not limited. Typically, the manufacturing process includes a step of forming a laminated electrode body including a positive electrode, a negative electrode, and a separator layer, a step of pressing the laminated electrode body in the lamination direction, a step of accommodating the pressed laminated electrode body in a predetermined housing to form a battery assembly, and a step of performing initial charging of the battery assembly (that is, the laminated electrode body).

For example, similarly to the conventional batteries of this type, the positive electrode active material layer 24 and the negative electrode active material layer 44 each can be formed by preparing a paste (slurry) composition including the above-described various components, coating the paste (slurry) composition on the positive electrode current collector 22 or the negative electrode current collector 42, drying the coated paste (slurry) composition, and pressing under an appropriate pressure (for example, about 5 MPa to 300 MPa).

The separator layer 30 can be formed by preparing a paste (slurry) composition including solid electrolyte particles and other components (binder and the like), coating the paste (slurry) composition on a separately prepared porous base material and drying.

Then, the laminated electrode body 10 can be fabricated by laminating the positive electrode 20 on which the positive electrode active material layer 24 is formed, the negative electrode 40 on which the negative electrode active material layer 44 is formed, and the separator layer 30.

Next, by pressing the laminated electrode body 10 at a predetermined pressing pressure (for example, 2 tons/cm$^2$ to 10 tons/cm$^2$), the mechanical strength of the laminated electrode body 10 and the conductivity (in other words, the ion conduction path) in each layer are improved. Then, a battery assembly can be obtained by respectively connecting a positive electrode terminal and a negative electrode terminal (not shown) for external connection to the positive electrode 20 and the negative electrode 40 of the laminated electrode body 10.

The target all-solid-state battery (all-solid-state lithium ion secondary battery in this embodiment) 1 can be produced by subjecting the obtained battery assembly to initial charging treatment and then to initial discharging treatment and further to optional appropriate aging treatment. It should be noted that the initial charging/discharging treatment and aging treatment may be appropriately performed according to the intended use and battery capacity, and do not characterize the present invention, so a detailed description thereof will be omitted.

In addition, when the all-solid-state battery disclosed herein is used as a high-output power source for driving a vehicle, a plurality of all-solid-state batteries is connected to each other to construct a battery module (also referred to as a battery pack), but the form of such a battery module may be the same as the conventional one, and does not characterize the present invention.

Hereinafter, some test examples relating to the all-solid-state battery (here, all-solid-state lithium ion secondary battery) disclosed herein will be described, but the present invention is not intended to be limited to the configurations shown in such test examples. The following compounding ratios are weight ratios.

Test Example 1: Manufacture of Test all-Solid-State Battery

A total of 11 types of all-solid-state lithium ion secondary batteries of Samples 1 to 11 were manufactured by the process described below.

Sample 1
Fabrication of Solid-Electrolyte-Coated Positive Electrode Active Material A $LiNi_{1/3}Mn_{1/3}Co_{1/3}O_2$ powder having an average particle diameter ($D_{50}$) of 6 μm as measured by the laser diffraction/scattering method was used as the positive electrode active material. Then, $LiNbO_3$ was coated on the surface of the positive electrode active material by using a sol-gel method.

Specifically, equimolar amounts of $LiOC_2H_5$ and $Nb(OC_2H_5)_5$ were dissolved in an ethanol solvent to prepare a metal alkoxide solution for coating. Then, under the atmospheric pressure, the metal alkoxide solution for coating was coated on the surface of the positive electrode active material by using a rolling fluidized coating device (model: SFP-01, produced by Powrex Corporation). At that time, the treatment time was adjusted so that the thickness of the coating film was about 5 nm. Next, the coated positive electrode active material was heat treated at 350° C. under atmospheric pressure for 1 h to obtain a positive electrode active material composed of $LiNi_{1/3}Mn_{1/3}Co_{1/3}O_2$ coated on the surface with $LiNbO_3$.

Fabrication of Positive Electrode

A positive electrode was then fabricated by using the obtained positive electrode active material and a $15LiBr·10LiI·75(0.75Li_2S·0.25P_2S_5)$ glass ceramic having an average particle diameter ($D_{50}$) of 2.5 μm as measured by the laser diffraction/scattering method as a sulfide solid electrolyte.

Specifically, the positive electrode active material and the sulfide solid electrolyte were weighed such that the weight ratio of the active material to the solid electrolyte was 75:25, 4 parts of a PVDF-based binder and about 6 parts of the conductive material (acetylene black) were weighed with respect to 100 parts of the active material, and these components were blended in butyl butyrate so as to obtain a solid content of 70 wt % and then kneaded with a stirrer to obtain a composition (positive electrode paste) for forming a positive electrode active material layer.

Next, the obtained positive electrode paste was uniformly coated by blade coating using a commercially available applicator on a positive electrode current collector made of an aluminum foil having a thickness of 15 μm so as to obtain a basis weight of 25 mg/cm$^2$. Thereafter, the coating film was dried at 120° C. for about 3 min to obtain a positive electrode in which the positive electrode active material layer was formed on one side of the positive electrode current collector made of an aluminum foil.

Fabrication of Negative Electrode

A negative electrode was fabricated by using a silicon (Si) powder having an average particle diameter ($D_{50}$) of 6 μm as measured by the laser diffraction/scattering method as a negative electrode active material and using a sulfide solid electrolyte of the same type as was used in the positive electrode.

Specifically, the negative electrode active material and the sulfide solid electrolyte were weighed such that the weight ratio of the active material to the solid electrolyte was 55:45, 6 parts of a PVDF-based binder and about 6 parts of the conductive material (acetylene black) were weighed with respect to 100 parts of the active material, and these components were blended in butyl butyrate so as to obtain a solid content of 70 wt % and then kneaded with a stirrer to obtain a composition (negative electrode paste) for forming a negative electrode active material layer.

Next, the obtained negative electrode paste was uniformly coated by blade coating using a commercially available applicator on a negative electrode current collector made of a copper foil having a thickness of 15 μm so as to obtain a basis weight of 5.6 mg/cm². Thereafter, the coating film was dried at 120° C. for about 3 min to obtain a negative electrode in which the negative electrode active material layer was formed on one side of the negative electrode current collector made of a copper foil.

Fabrication of Separator Layer

A fibrous polyethylene film having a porosity of 85% and a thickness of 40 μm was used as a porous base material, and a composition for forming a solid electrolyte layer was coated on both sides of the polyethylene film.

Specifically, a composition (solid electrolyte paste) for forming a solid electrolyte layer was obtained by weighing 98 parts of a sulfide solid electrolyte and 2 parts of an SBR-based binder similar to those of the positive and negative electrodes, blending in a heptane solvent to obtain a solid content of 70 wt %, and ultrasonically dispersing for about 2 min by using an ultrasonic dispersion device (model: UH-50, manufactured by SMT Corporation).

Subsequently, the obtained paste was uniformly coated on both sides of the polyethylene film in the same manner as in the fabrication of the positive electrode to obtain a basis weight of 4 mg/cm² per one side. The coating was then naturally dried. Thereafter, the coated portions on both sides were wiped off with heptane so that the coated surface became 2 cm×2 cm, and dried at 100° C. for 30 min. As a result, a plurality of 4 cm×4 cm rectangular separator sheets was fabricated, each separator sheet having a 2 cm×2 cm solid electrolyte coated portion at the center portion and a solid electrolyte uncoated portion of 1 cm or more formed at the periphery thereof.

Fabrication of all-Solid-State Battery

The fabricated positive electrode was punched into a 2 cm×2 cm shape, arranged so that the positive electrode active material layer was pasted on the 2 cm×2 cm solid electrolyte coated surface of the separator sheet, and pressed at a pressure of 1 ton/cm².

Subsequently, the negative electrode was punched into a 3 cm×3 cm shape, and the surface of the separator sheet on which the positive electrode was not pasted was arranged in the center portion on the negative electrode active material layer. As a result, a laminated body was formed in which the protruding portions of the negative electrode and the separator were formed around the 2 cm×2 cm opposed portions of the positive and negative electrodes (laminated portions of the positive and negative electrode). The laminated body was then pressed under a temperature condition of 170° C. at a pressure of 3 tons/cm². The pressing step was performed a total of 12 times. Two laminated bodies were prepared, the negative electrode current collectors were laminated to each other, and the abovementioned pressing was repeated three times to fabricate a laminated electrode body.

Next, the protruding portions of the separator sheets present on the four sides of the laminated electrode body were thermally fused by Lamisealer at 180° C. for about 5 sec to form dense structure portions. At this time, since it is difficult to determine the numerical values (distances) of the A and B visually, the end portions of the laminated portions of the positive and negative electrodes were observed with an optical microscope, and the dense structure portion was formed so that A/B was 0.8.

The laminated electrode body thus obtained was hermetically sealed in a housing made of an aluminum laminated film to which positive and negative electrode terminals were attached in advance to fabricate a test all-solid-state battery (all solid-state lithium ion secondary battery) of Sample 1.

Sample 2

A test all-solid-state battery (all-solid-state lithium ion secondary battery) of Sample 2 was fabricated by using the same materials and steps as in the fabrication of the battery of Sample 1, except that the temperature of thermal fusion by Lamisealer was changed to 170° C.

Sample 3

A test all-solid-state battery (all-solid-state lithium ion secondary battery) of Sample 3 was fabricated by using the same materials and steps as in the fabrication of the battery of Sample 1, except that the dense structure portion was formed so that A/B was 0.5.

Sample 4

A test all-solid-state battery (all-solid-state lithium ion secondary battery) of Sample 4 was fabricated by using the same materials and steps as in the fabrication of the battery of Sample 1, except that the porosity of the polyethylene film was changed to 80% and the basis weight per side was changed to 3.8 mg/cm² in the fabrication of the separator sheet.

Sample 5

A test all-solid-state battery (all-solid-state lithium ion secondary battery) of Sample 5 was fabricated by using the same materials and steps as in the fabrication of the battery of Sample 1, except that the porosity of the polyethylene film was changed to 90% and the basis weight per side was changed to 4.2 mg/cm² in the fabrication of the separator sheet.

Sample 6

A test all-solid-state battery (all-solid-state lithium ion secondary battery) of Sample 6 was fabricated by using the same materials and steps as in the fabrication of the battery of Sample 1, except that a polyamide-imide film having a porosity of 85% was used instead of the polyethylene film in the fabrication of the separator sheet and the temperature of thermal fusion by Lamisealer was changed to 250° C.

Sample 7

A test all-solid-state battery (all-solid-state lithium ion secondary battery) of Sample 7 was fabricated by using the same materials and steps as in the fabrication of the battery of Sample 1, except that a thermoplastic polyimide film having a porosity of 85% was used instead of the polyethylene film in the fabrication of the separator sheet and the temperature of thermal fusion by Lamisealer was changed to 250° C.

Sample 8

A test all-solid-state battery (all-solid-state lithium ion secondary battery) of Sample 8 was fabricated by using the same materials and steps as in the fabrication of the battery of Sample 1, except that the thermal fusion treatment by Lamisealer was not performed (that is, the dense structure portion was not formed).

Sample 9

A test all-solid-state battery (all-solid-state lithium ion secondary battery) of Sample 9 was fabricated by using the same materials and steps as in the fabrication of the battery of Sample 1, except that the solid electrolyte paste was directly coated on the cathode active material layer without using a support.

Sample 10

A test all-solid-state battery (all-solid-state lithium ion secondary battery) of Sample 10 was fabricated by using the same materials and steps as in the fabrication of the battery of Sample 1, except that the thermal fusion temperature by Lamisealer was changed to 150° C.

Sample 11

A test all-solid-state battery (all-solid-state lithium ion secondary battery) of Sample 11 was fabricated by using the same materials and steps as in the fabrication of the battery of Sample 1, except that the dense structure portion was formed so that AB was 1.3.

Test Example 2: Measurement of Porosity of Thermally Fused Portion of Protruding Portions of Separator Sheets of Each Sample The thickness of the thermally fused portion was measured with an optical microscope, and the porosity of the thermally fused portion was calculated. The calculation results are shown in the corresponding column of Table 1.

Test Example 3: Resistance Measurement and Vibration Test of Each Sample

Initial charging and discharging were performed for each sample battery, and then resistance measurement was performed and the presence or absence of short circuit caused by a vibration test was investigated.

Specifically, the batteries of each sample were restricted to a fixed size in the lamination direction of the electrode bodies at 10 MPa, and then initial charging and discharging were performed under the following conditions. That is, charging was performed at 4.1 V-CCCV, current rate 15 mA, and 1 mA current cut, and discharging was performed at CC 2.5 V cut and current rate 15 mA. Then, after charging the capacity of half of the discharge capacity obtained in the initial cycle, discharging was performed at 50 mA for 5 sec, and battery resistance was determined from the voltage drop amount at that time. As a result, it was confirmed that all the samples had a battery resistance of 3.4Ω to 4.6Ω which did not interfere with use.

In the vibration test, after the battery was charged to 4.1 V under the same conditions as in the initial charging, the vibration test was performed at 1000 Hz for 1 h while measuring the current value with a vibration test machine. The presence or absence of occurrence of a short circuit in such test is shown in the corresponding column of Table 1.

TABLE 1

| Sample No. | Base material | Porosity of base material (vol %) | | A/B | Presence or absence of short circuit |
| | | Main body | Thermal fusion | | |
|---|---|---|---|---|---|
| 1 | Polyethylene | 85 | 1 | 0.8 | Absent |
| 2 | Polyethylene | 85 | 6 | 0.8 | Absent |
| 3 | Polyethylene | 85 | 1 | 0.5 | Absent |
| 4 | Polyethylene | 80 | 1 | 0.8 | Absent |
| 5 | Polyethylene | 90 | 1 | 0.8 | Absent |
| 6 | Polyamide imide | 85 | 1 | 0.8 | Absent |
| 7 | Polyimide | 85 | 1 | 0.8 | Absent |
| 8 | Polyethylene | 85 | — | — | Short circuit after 10 sec |
| 9 | None | — | — | — | Short circuit after 10 sec |
| 10 | Polyethylene | 85 | 10 | 0.8 | Short circuit after 14 min |
| 11 | Polyethylene | 85 | 1 | 1.3 | Short circuit after 36 min |

As is clear from the results shown in Table 1, in the batteries of Samples 1 to 7 in which the dense structure portion having a porosity of less than 10% was formed by thermal fusion of the protruding portions of the separator sheets at a position where A/B is 0.8 or less, no short-circuit between positive and negative electrodes occurred in the vibration test. Meanwhile, in the battery of Sample 11, since A/B was 1 or more at the site where the dense structure portion was formed, a short circuit occurred 36 min after the start of the vibration test. As a result, it is recognized that it is preferable to form the dense structure portion at a position where A<B.

Although specific examples of the present invention have been described in detail above, these are merely illustrative and do not limit the scope of the claims. Techniques set forth in the claims include those in which the concrete examples exemplified above are variously modified and changed. The all-solid-state battery disclosed herein is suitable as a driving power source to be mounted on vehicles such as electric vehicles (EV), hybrid vehicles (HV), plug-in hybrid vehicles (PHV) and the like.

What is claimed is:

1. An all-solid-state battery comprising a laminated electrode body of a laminated structure having:
    a positive electrode in which a positive electrode active material layer including positive electrode active material particles and solid electrolyte particles is formed on a positive electrode current collector;
    a negative electrode in which a negative electrode active material layer including negative electrode active material particles and solid electrolyte particles is formed on a negative electrode current collector; and
    a separator layer including a base material having a porous structure and solid electrolyte particles held on the base material, wherein
    the negative electrode and the separator layer each have a protruding portion protruding outward beyond end portions of opposed portions of the positive electrode and the negative electrode at least in a part of an end portion of the laminated electrode body;
    at least a part of the protruding portion of the separator layer is formed of a dense structure portion that is dense enough to prevent contact between the positive electrode and the negative electrode; and
    the dense structure portion is formed at a position satisfying A<B, where A denotes a shortest distance from the end portion of the opposed portions of the positive electrode and the negative electrode to the dense structure portion, and B denotes a shortest distance from a surface of the negative electrode active material layer at the end portion of the opposed portions of the positive electrode and the negative electrode to the positive electrode current collector at the end portion of the opposed portions.

2. The all-solid-state battery according to claim 1, wherein the porous base material and the dense structure portion are composed of a thermoplastic resin.

3. The all-solid-state battery according to claim 2, wherein the porous base material has a porosity of at least 80%.

4. The all-solid-state battery according to claim 3, wherein the laminated electrode body is formed by laminating rectangular positive and negative electrodes and separator layer, and the dense structure portion is formed in a protruding portion of an end portion of each side edge of the rectangular separator layer.

5. The all-solid-state battery according to claim 2, wherein the laminated electrode body is formed by laminating rectangular positive and negative electrodes and separator layer, and the dense structure portion is formed in a protruding portion of an end portion of each side edge of the rectangular separator layer.

6. The all-solid-state battery according to claim 1, wherein the porous base material has a porosity of at least 80%.

7. The all-solid-state battery according to claim 6, wherein the laminated electrode body is formed by laminating rectangular positive and negative electrodes and separator layer, and the dense structure portion is formed in a protruding portion of an end portion of each side edge of the rectangular separator layer.

8. The all-solid-state battery according to claim 1, wherein the laminated electrode body is formed by laminating rectangular positive and negative electrodes and separator layer, and the dense structure portion is formed in a protruding portion of an end portion of each side edge of the rectangular separator layer.

* * * * *